United States Patent
Lehotsky

(10) Patent No.: US 12,233,944 B2
(45) Date of Patent: Feb. 25, 2025

(54) VEHICLE ROOF COMPRISING A SUPPORT FOR AT LEAST TWO ENVIRONMENT SENSORS

(71) Applicant: Webasto SE, Stockdorf (DE)

(72) Inventor: Juraj Lehotsky, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 315 days.

(21) Appl. No.: 17/989,008

(22) Filed: Nov. 17, 2022

(65) Prior Publication Data
US 2023/0182823 A1    Jun. 15, 2023

(30) Foreign Application Priority Data

Dec. 2, 2021    (DE) .................... 10 2021 131 789.4

(51) Int. Cl.
*B62D 25/06*    (2006.01)
*B60R 11/02*    (2006.01)
*B60R 11/04*    (2006.01)

(52) U.S. Cl.
CPC .......... *B62D 25/06* (2013.01); *B60R 11/0258* (2013.01); *B60R 11/04* (2013.01)

(58) Field of Classification Search
CPC ...... B62D 25/06; B60R 11/04; B60R 11/0258
USPC .............................................. 296/210, 211
See application file for complete search history.

(56) References Cited

U.S. PATENT DOCUMENTS

2020/0100397 A1*  3/2020  Kamil ................. H05K 5/0213
2021/0199476 A1*  7/2021  Kortlang ............... G01J 1/0242

FOREIGN PATENT DOCUMENTS

| CN | 206945891 U | * | 1/2018 | |
|---|---|---|---|---|
| DE | 10 2016 224 666 A1 | | 6/2018 | |
| DE | 10 2017 214 303 A1 | | 2/2019 | |
| DE | 10 2018 122 868 A1 | | 3/2020 | |
| DE | 10 2018 216 426 A1 | | 3/2020 | |
| DE | 10 2020 102 874 A1 | | 8/2021 | |
| DE | 102020102304 A1 | * | 8/2021 | ............. B60Q 5/005 |

OTHER PUBLICATIONS

CN206945891 Text (Year: 2018).*
DE102020102304 Text (Year: 2021).*

* cited by examiner

*Primary Examiner* — Dennis H Pedder
(74) *Attorney, Agent, or Firm* — Fitch, Even, Tabin & Flannery, LLP

(57) ABSTRACT

A vehicle roof, in particular for a passenger car, the vehicle roof having a roof skin which forms a visible outer surface of the vehicle roof, and a sensor unit having at least two environment sensors for detecting a vehicle environment, the sensor unit being disposed below the roof skin and attached to a carrier and may have a support for the at least two environment sensors, the support being connected to a thermal management system. An electrical insulation element is disposed between each of the environment sensors and the support, the electrical insulation elements thermally coupling the respective environment sensors and the support.

13 Claims, 4 Drawing Sheets

VEHICLE ROOF COMPRISING A SUPPORT FOR AT LEAST TWO ENVIRONMENT SENSORS

CROSS-REFERENCE TO RELATED APPLICATION

This application claims priority from German patent application no. 10 2021 131 789.4 filed on Dec. 2, 2021, which is hereby incorporated herein by reference in its entirety for all purposes.

FIELD

The invention relates to a vehicle roof, in particular a vehicle roof for a passenger car, the vehicle roof comprising the features of the preamble of claim 1.

BACKGROUND

Such a vehicle roof is in particular a roof module, which is a separate component placed on top of roof side rails and/or transverse roof rails, which are part of a vehicle body forming a vehicle carcass, when in the installed state. The vehicle roof comprises a roof skin, which forms a visible outer surface of the vehicle roof, and a sensor unit having at least two environment sensors for detecting the vehicle environment. The environment sensors are part of a system enabling the vehicle in question to drive autonomously or semi-autonomously.

Furthermore, it is known from practice for the environment sensors of one sensor unit to be installed on a common platform, which forms a support for the environment sensors and is itself placed on top of a roof frame, which forms a carrier of the vehicle roof in question, the roof skin being also attached to said carrier. The support can be connected to a thermal management system, which discharges heat from the support and the environment sensors and thus enables cooling of the environment sensors, in order to keep the environment sensors in a temperature range enabling optimal operation. The fact that the two environment sensors are not sufficiently electrically decoupled from each other on the support can pose a problem.

SUMMARY

The object of the invention is to provide a vehicle roof of the kind described above whose environment sensors are accommodated in the support in such a manner that optimal operating conditions can be established.

According to the invention, this object is attained by the vehicle roof having the features of claim 1.

So, according to the invention, a vehicle roof, in particular a vehicle roof for a passenger car, is proposed, the vehicle roof comprising a roof skin, which forms a visible outer surface of the vehicle roof, and a sensor unit having at least two environment sensors for detecting a vehicle environment. The sensor unit, which is disposed below the roof skin and attached to a carrier, comprises a support for the at least two environment sensors, the support being connected to a thermal management system. In order to enable a flawless operation while keeping the design of the thermal management system compact, an electrical insulation element is disposed between each of the environment sensors and the support, the electrical insulation elements thermally coupling the respective environment sensors and the support.

The integration of the environment sensors into the support according to the invention makes it possible for a uniform working temperature to be achieved for the environment sensors since a thermal management system can be coupled directly to the support in a centralized manner. The thermal coupling of the environment sensors with the support via the insulation element can ensure cooling via the centralized thermal management system. At the same time, the electrical insulation element ensures a galvanic decoupling of the environment sensors; i.e., housings of the environment sensors can thus have different electrical potentials. The support can be considered a multi-functional support for multiple environment sensors, via which the sensor unit is attached to the carrier. The carrier is preferably formed by a roof frame of the vehicle roof or another mounting platform provided in the vehicle roof according to the invention.

The attachment of the environment sensors to the support enables a preassembly of these components and thus a simplified final installation of the sensor unit on the carrier. So the support accommodates multiple components at once.

In a preferred embodiment of the vehicle roof according to the invention, the electrical insulation elements are each a sleeve-like insert of the support, the sleeve-like inserts accommodating the respective environment sensors in an at least largely form-fitting manner. So the environment sensors are inserted into the respective sleeve-like inserts, which are in turn inserted into respective corresponding seats of the support with their circumference in an at least largely form-fitting manner.

The sleeve-like inserts are each secured to the support by means of an in particular resilient fixation together with the environment sensors accommodated in each of them in order to be able to compensate for different thermal expansion behaviors of the different materials used. For example, the resilient fixation is a clip or a bracket which is in contact with the back of the environment sensor and the back of the sleeve-like insert and fixed to the support by means of a tab or a screw, for example.

In another specific embodiment of the vehicle roof according to the invention, the support is mirror-symmetrical with respect to its vertically oriented center plane, the support having a seat for one of the environment sensors and the associated insulation element on either side of the center plane. The support can be disposed centrally in the area of a front edge or a rear edge of the vehicle roof, in which case the center plane coincides with a vertical longitudinal center roof plane.

The environment sensors, which are disposed on the support, can basically be configured in any manner. In a specific embodiment, however, the environment sensors are each formed by a camera. Together, the cameras can be part of one or more than one stereo camera.

It is also possible for the environment sensors to each be formed by a lidar sensor, a radar sensor, an acoustic wave sensor, an antenna device and/or the like.

In a preferred embodiment of the vehicle roof according to the invention, the support is a metallic cast part or milled part so that the support has a high thermal conductivity and the environment sensors can thus be temperature-controlled by means of the support, the electrical insulation elements, which thermally couple the environment sensors to the support, preferably each being made of a plastic whose thermal conductivity is at least 2.5 W/m·K and in particular at least 5.0 W/m·K.

In particular, the plastic from which the insulation elements are made can comprise PET (polyethylene terephthalate) and/or TPE (thermoplastic elastomer).

In a specific embodiment, the thermal management system of the vehicle roof according to the invention comprises what is referred to as heat pipes, i.e., heat-conducting pipes, which are connected to the support and to a heat exchanger so that the support and thus the environment sensors can be efficiently temperature-controlled, i.e., cooled. The heat exchanger can be associated with other components of the vehicle roof, such as another environment sensor, which is a lidar sensor.

As mentioned above, the carrier can be a frame of the vehicle roof. The support can be connected to the frame in a window-like cutout of the frame. In particular, the support can be attached to the frame from below.

A preferred embodiment of the vehicle roof according to the invention is configured as a roof module. In an integrated manner, such a roof module forms a structural unit in which components required for autonomous or semi-autonomous driving of the vehicle in question are accommodated. So a plurality of functional elements can be integrated in the roof module. It can be connected to a vehicle body or a vehicle carcass, which comprises roof rails, such as roof side rails and/or transverse roof rails, as a compact structural unit by a vehicle manufacturer. In this case, the roof module is what is referred to as a roof sensor module (RSM), which enables the vehicle in question to drive autonomously or semi-autonomously.

In an autonomous driving mode, a vehicle equipped with the vehicle roof according to the invention and configured as an autonomously driving vehicle drives itself without at least substantial intervention by a driver. In a semi-autonomous driving mode, the vehicle roof according to the invention can be part of a driver assistance system.

The vehicle roof according to the invention can be provided with a transparent fixed roof portion and/or a roof opening system for a roof opening.

In particular, the vehicle roof according to the invention is a roof of a passenger car. However, it can also be a roof of a utility vehicle, which is a delivery van, a bus, an autonomously driving small bus, such as what is referred to as a people mover, or a tractor unit, for example.

The invention also relates to a motor vehicle that comprises a vehicle roof of the kind described above and of which a vehicle carcass, in particular, can therefore be provided with a roof module configured as a roof sensor module.

Other advantages and advantageous configurations of the subject matter of the invention are apparent from the description, the drawing and the claims.

An exemplary embodiment of a motor vehicle having a vehicle roof according to the invention is schematically illustrated in the drawing and will be discussed in more detail in the following description.

BRIEF DESCRIPTIONS OF THE DRAWINGS

FIG. 5 is a perspective section through the sensor unit along line V-V in

FIG. 4; and

Figure 1:
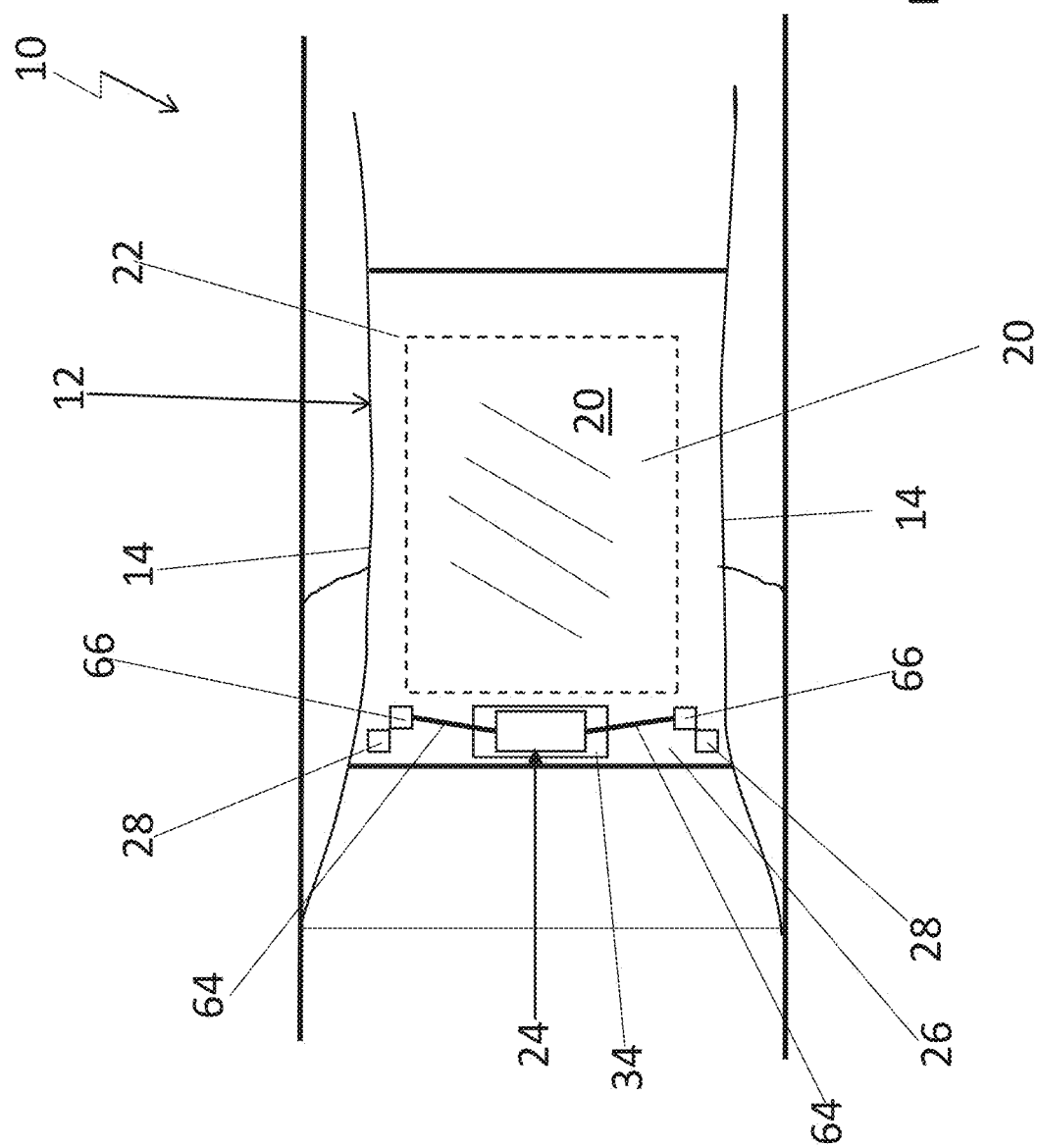
FIG. 1 is a top view of a motor vehicle having a vehicle roof according to the invention.
Figure 2:
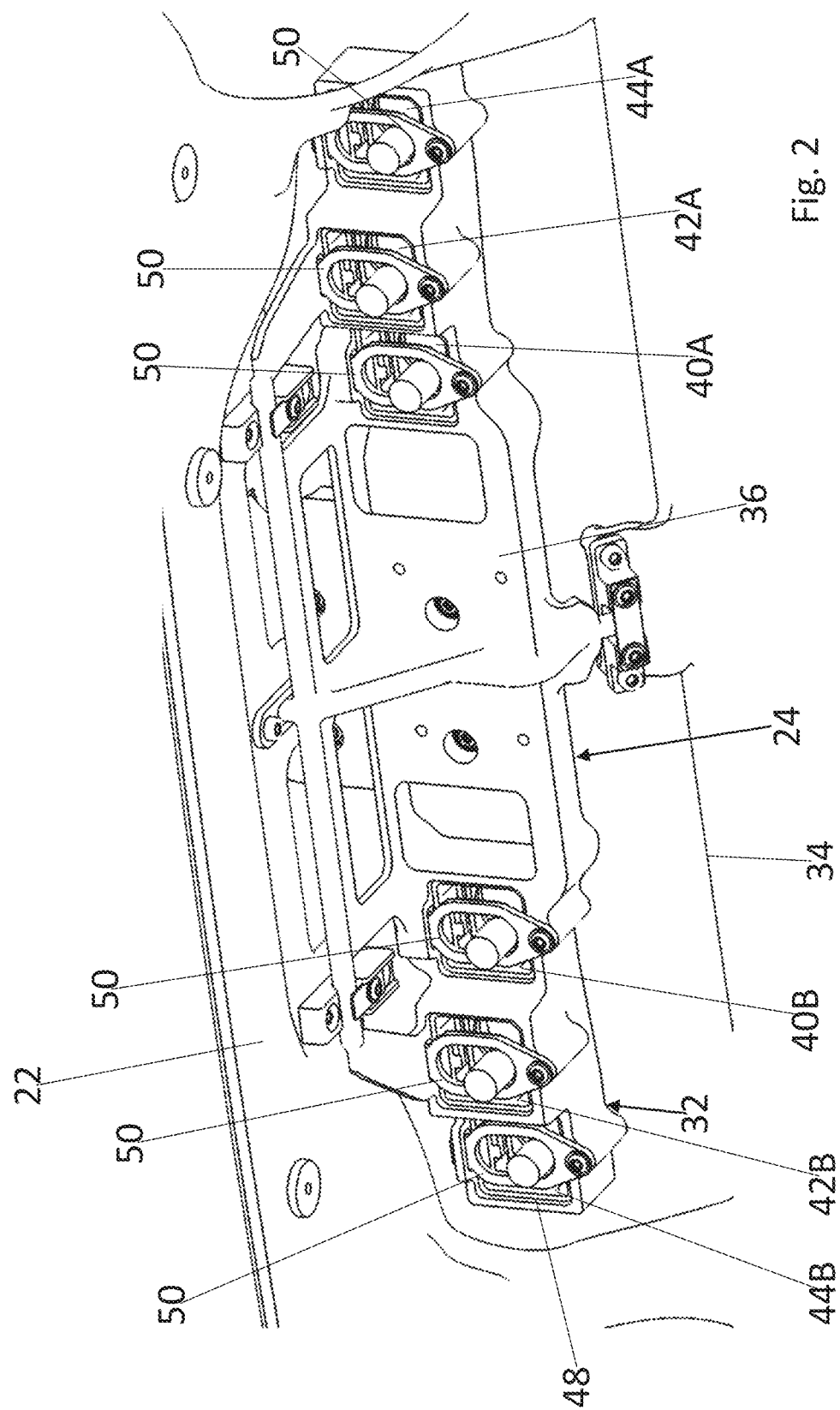
FIG. 2 is an interior view of a frame front part of a roof frame of the vehicle roof.
Figure 3:
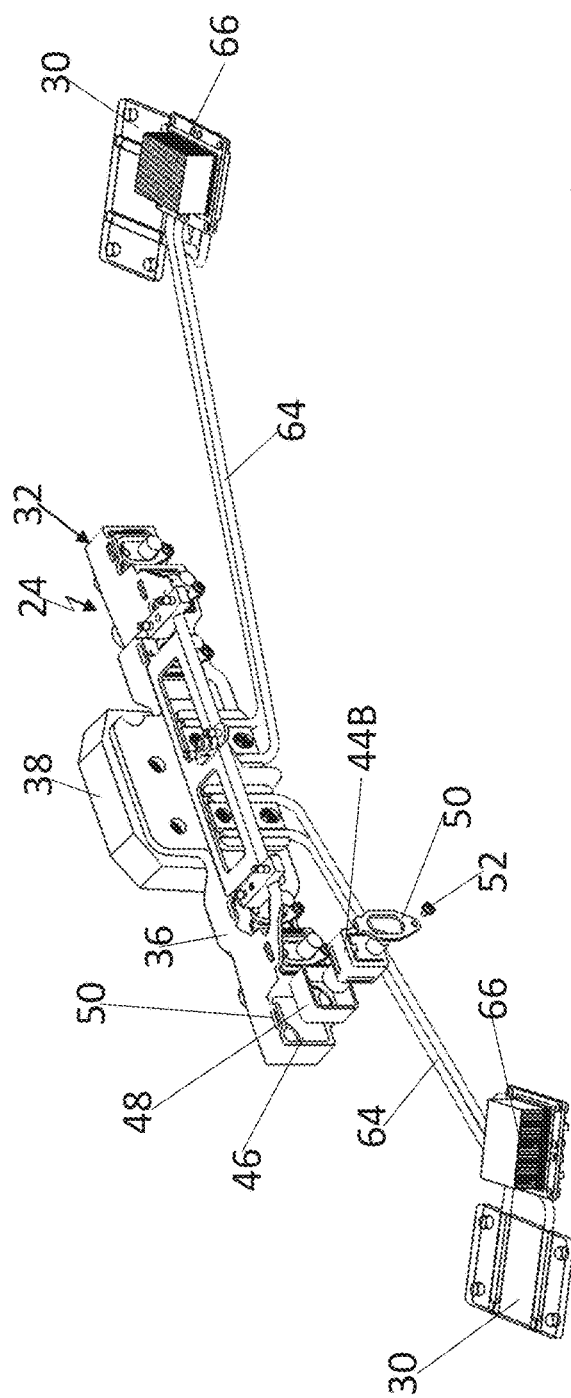
FIG. 3 is a rear view of a sensor assembly of the vehicle roof.
Figure 4:
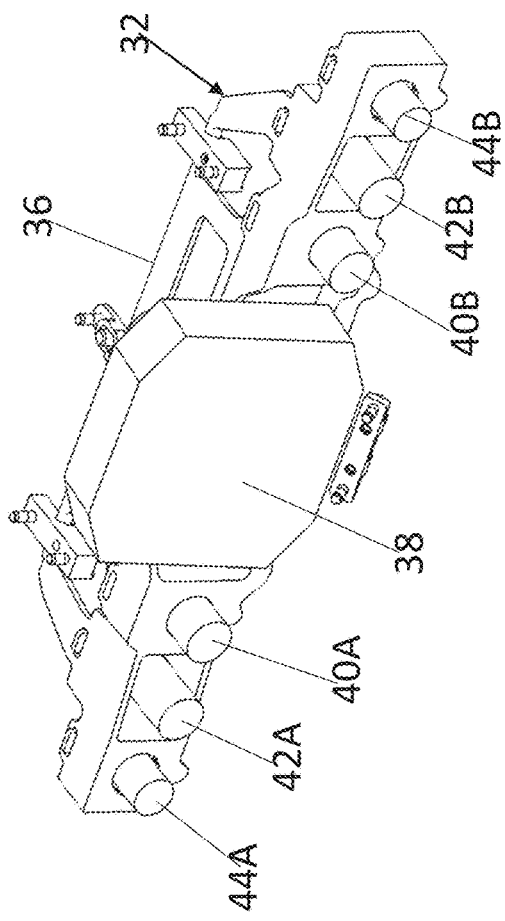
FIG. 4 is a perspective front view of a middle sensor unit of the sensor assembly.
Figure 5:
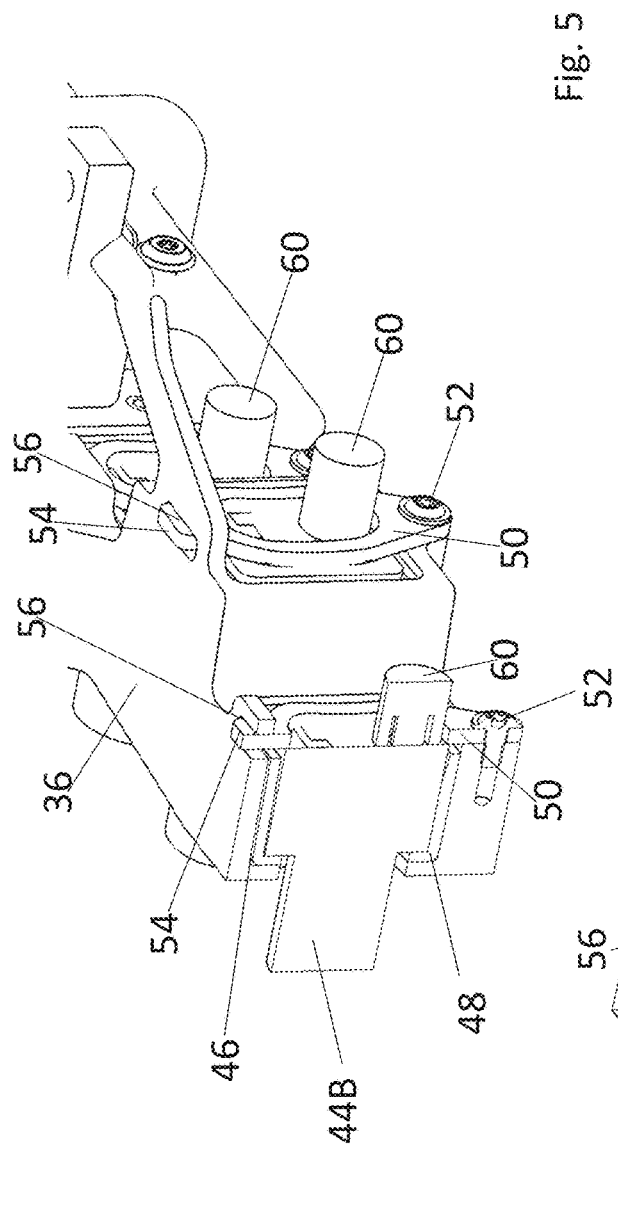
Figure 6:
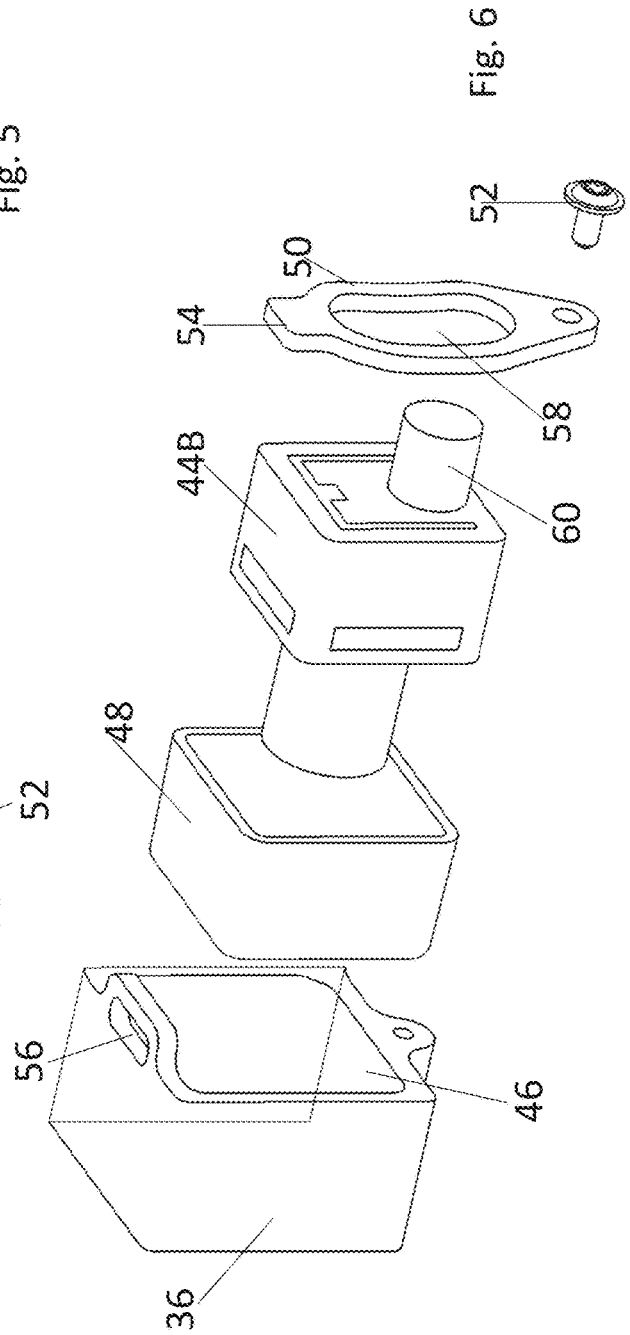

FIG. 6 is an enlarged illustration of the sensor unit in the area V-V in FIG. 2, which illustrates how an environment sensor is mounted in a support of the sensor unit.

DETAILED DESCRIPTION

The drawing shows a motor vehicle 10, which is a passenger car and provided with a vehicle roof 12, which comprises a roof side rail 14 on either side of a longitudinal center roof plane, roof side rail 14 being part of a vehicle body, which is a carcass. A roof module 16, which covers a vehicle interior of motor vehicle 10, is fixed to roof side rails 14, which form a carcass support structure.

Roof module 16 comprises a roof skin 18, which can form a transparent roof portion 20, through which light can enter the vehicle interior, in a central area. Roof skin 18 is disposed on or attached to a circumferential roof frame 22, which is a carrier of roof module 16 and also a point of connection of roof module 16 to the vehicle carcass.

Roof module 16 is a roof sensor module (RSM), which is equipped with devices enabling motor vehicle 10 to drive autonomously. To this end, roof module 16 has a sensor system, which comprises a sensor assembly 24, by means of which the vehicle environment can be detected to allow motor vehicle 10 to drive autonomously. A current traffic situation can be determined by evaluating the measuring signals of sensor assembly 24 by means of a controller of motor vehicle 10, allowing motor vehicle 10 to autonomously or automatically adapt to the current traffic situation and behave accordingly.

Sensor assembly 24 is disposed on a front transverse frame part 26 of roof frame 22 and comprises two environment sensors 28, which are each disposed in a corner area of roof module 16, environment sensors 28 being lidar sensors and each being disposed on a support plate 30, which is attached to roof frame 22. Moreover, sensor assembly 24 comprises a middle sensor unit 32, which is attached to roof frame 22 in the area of a front center window-like cutout 34 of roof frame 22.

Sensor unit 32 comprises a support 36, which is made of an aluminum pressure die cast part and serves as a carrier for a radar device 38, which is disposed centrally, and, in the case at hand, for six cameras 40A, 40B, 42A, 42B, 44A and 44B. To this end, support 36 is rail-shaped and has six seats 46 for cameras 40A, 40B, 42A, 42B, 44A and 44B, which are environment sensors, on its rear side. Seats 46, which are formed during the pressure die casting process, each have a rectangular, in particular square, base area. An electrical insulation element 48 is disposed in each of seats 46 for galvanic decoupling, electrical insulation element 48 being a sleeve-like insert having a rectangular or square base area and being made of a PET plastic having a thermal conductivity of 6.5 W/m·K or a TPE plastic having a thermal conductivity of 2.0 W/m·K. One of cameras 40A, 40B, 42A, 42B, 44A and 44B is inserted into each of insulation elements 48, which are disposed in seats 46 in a form-fitting manner, in such a manner that their housings are surrounded by respective insulation elements 48 in a form-fitting manner. The high thermal conductivity of insulation elements 48 thermally couples cameras 40A, 40B, 42A, 42B, 44A and 44B to support 36 while they are galvanically decoupled from each other.

Insulation elements 48 with the cameras disposed therein are each fixed by means of a resilient bracket 50, which is a fixation and whose lower end is screwed to support 36 by means of a screw 52 and which has a tab 54 at its upper end, tabs 54 engaging respective slots 56 of support 36. Brackets 50 each have a recess 58, recesses 58 resembling oblong holes and being penetrated by respective connection elements 60 of respective cameras 40A, 40B, 42A, 42B, 44A and 44B.

Support 36, which is mirror-symmetrical with respect to a vertical longitudinal center roof plane, has two heat-conducting plates 62 on its rear side, to each of which heat pipes 64, i.e., heat-conducting pipes, are connected, which lead to a heat exchanger 66, which is associated with one of environment sensors 28 disposed in the corner areas of roof module 16.

Cameras 40A and 40B form the two camera heads of a stereo camera for close-range detection. Cameras 42A and 42B form the two camera heads of a stereo camera serving in particular for far-range detection. Camera 44A serves to detect traffic signs, in particular traffic lights which especially correspond to traffic lights used in Europe in the case at hand. Camera 44B serves to detect traffic signs and traffic lights predominantly used in the US.

The connection of support 36 to heat pipes 64 and thus heat exchangers 66 enables thermal management for all environment sensors (radar device 38 and cameras 40A, 40B, 42A, 42B, 44A and 44B) installed on support 36 by means of heat exchangers 66, which are part of a thermal management system.

The invention claimed is:

1. A vehicle roof comprising:
a roof skin, which forms a visible outer surface of the vehicle roof, and
a sensor unit having at least two environment sensors for detecting a vehicle environment,
the sensor unit being disposed below the roof skin and attached to a carrier and comprising a support for the at least two environment sensors,
the support being connected to a thermal management system,
wherein an electrical insulation element is disposed between each of the environment sensors and the support, the electrical insulation elements thermally coupling the respective environment sensors and the support.

2. The vehicle roof according to claim 1, wherein the electrical insulation elements are each a sleeve-like insert of the support, the sleeve-like inserts accommodating the respective environment sensors in an at least largely form-fitting manner.

3. The vehicle roof according to claim 2, wherein the sleeve-like inserts are each secured to the support by a resilient fixation together with the respective environment sensors accommodated therein.

4. The vehicle roof according to claim 1, wherein the support is a mirror image with respect to a vertical center plane and has a seat for one of the environment sensors and the associated insulation element on either side of the center plane.

5. The vehicle roof according to claim 1, wherein the environment sensors are cameras of one or more than one stereo camera.

6. The vehicle roof according to claim 1, wherein the support is a metallic cast part or milled part and that the electrical insulation elements are each made of a plastic whose thermal conductivity is at least 2.0 W/m·K.

7. The vehicle roof according to claim 6, wherein the plastic comprises PET and/or TPE.

8. The vehicle roof according to claim 1, wherein the thermal management system comprises heat pipes which are connected to the support and to a heat exchanger.

9. The vehicle roof according to claim 8, wherein the heat exchanger is associated with another environment sensor.

10. The vehicle roof according to claim 1, wherein the carrier is a frame of the vehicle roof and the support is connected to the frame in a window-like cutout of the frame.

11. The vehicle roof according to claim 1, wherein it is a roof module forming a structural unit configured to be connected to a vehicle body in an integrated manner.

12. A motor vehicle comprising a vehicle roof according to claim 1.

13. The vehicle roof according to claim 6 wherein the electrical insulation elements made of a plastic whose thermal conductivity is at least 5.0 W/m·K.

* * * * *